(No Model.)
B. F. WOODS.
APPARATUS FOR FILTERING AND PURIFYING SEWAGE, &c.
No. 272,997. Patented Feb. 27, 1883.
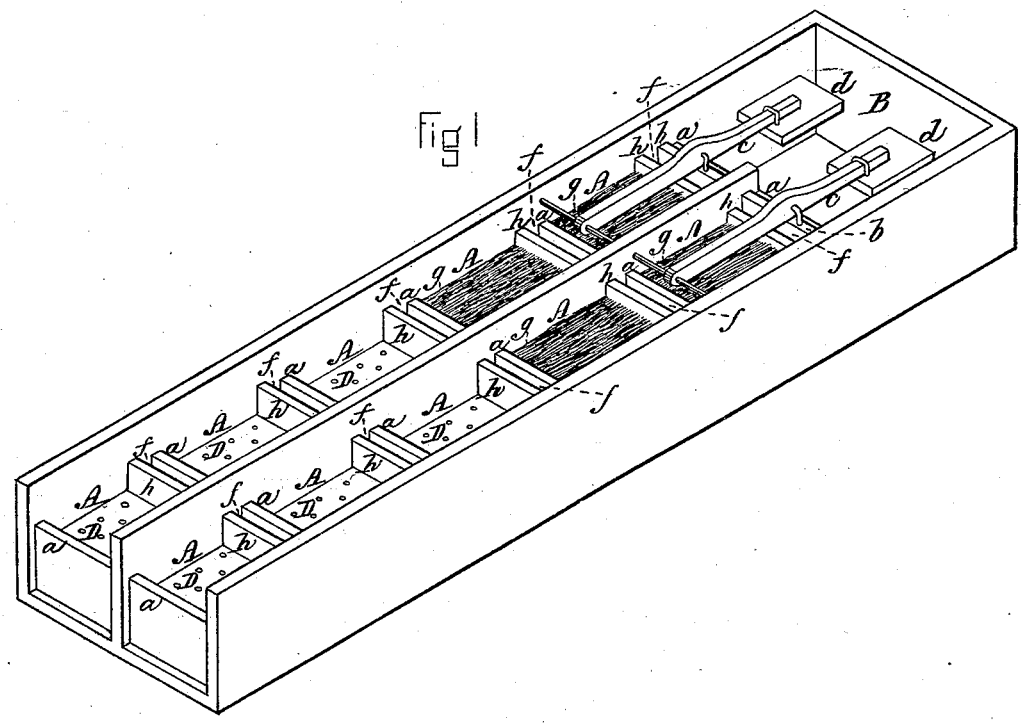
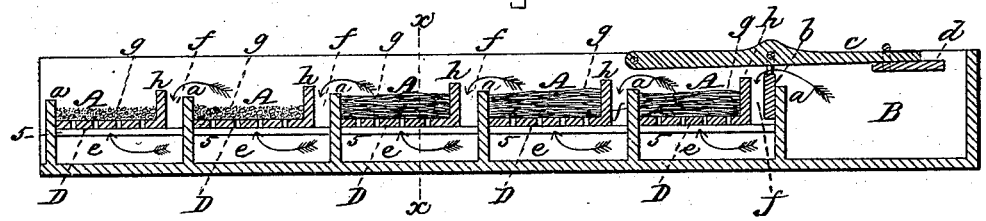
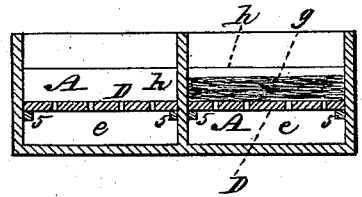
WITNESSES
W. J. Cambridge
Chas. E. Griffin
INVENTOR
Benjamin F. Woods

UNITED STATES PATENT OFFICE.

BENJAMIN F. WOODS, OF ARLINGTON, MASSACHUSETTS.

APPARATUS FOR FILTERING AND PURIFYING SEWAGE, &c.

SPECIFICATION forming part of Letters Patent No. 272,997, dated February 27, 1883.

Application filed September 5, 1882. (No model.)

*To all whom it may concern:*

Be it known that I, BENJAMIN F. WOODS, a citizen of the United States, residing at Arlington, in the county of Middlesex and State of Massachusetts, have invented an Improved Apparatus for Filtering and Purifying Sewage and other Liquids, of which the following is a full, clear, and exact description, reference being had to the accompanying drawings, making part of this specification, in which—

Figure 1 is a perspective view of my improved filtering apparatus. Fig. 2 is a longitudinal vertical section through the same. Fig. 3 is a transverse section through the same on the line $x\ x$ of Fig. 2.

My invention has for its object particularly to filter and purify the sewage of cities and towns in a more rapid and effectual manner than heretofore and at the same time avoid the frequent clogging or obstruction of the filtering material or medium, which has hitherto proved such a serious obstacle to the successful performance of this work; and my invention consists in certain details of construction and combination of parts, as hereinafter fully explained, and specifically pointed out in the claim.

In the said drawings, A A represent a series of filtering chambers or receptacles, arranged in line with each other, the first or front chamber being placed next to the receiving or settling tank or basin B, into which the sewage or other liquid is first conducted, and from which it flows over the ledge or partition $a$ into the first chamber A; a gate, $b$, being located at this point, which gate is connected with a lever, $c$, provided at its outer end with a float, $d$, adapted to rest on the surface of the liquid in the tank B, whereby the gate is operated automatically in such manner as to regulate and equalize the flow of the sewage or other liquid to the filtering-chambers.

Within each of the chambers A is placed, upon suitable supports, 5, a screen or perforated plate, D, which is raised above the bottom of the chamber in order to leave a space, $e$, the length of the screen being somewhat less than that of the chamber, whereby a passage, $f$, is left between the front end of the screen D and the front wall, $a$, of the chamber, through which the sewage or other liquid flows down into the space $e$, and thence finds its level by passing up through the screen (which is always below the level of the liquid in the tank or basin B) and the filtering material $g$, which is placed upon and over its entire upper surface, and close against a ledge, $h$, projecting up from its front edge.

The sewage or liquid, after passing up through the screen and filtering material, flows over the upper edge of the front wall, $a$, of the next filtering-chamber A in line and down into the space $e$, at the bottom thereof, up through its screen and the filtering material thereon, and thence to the next chamber, and so on throughout the entire series, which may consist of any desired number, the liquid portion of the sewage flowing from the last chamber A in a clear and purified state, while the sediment or solid matter is precipitated to the bottoms of the filtering-chambers and collected therein, to be afterward removed and utilized as a fertilizer. The screens D and the filtering material thereon are held down against the flow or upward pressure of the sewage or liquid by weights or other suitable means.

The filtering material used is preferably hay or straw for the first chambers of the series and charcoal and sand for the succeeding chambers; but any other suitable filtering material or substance may be employed.

I prefer to provide the front end of each screen D with an upwardly-projecting ledge, $h$, as it serves as a guard to prevent the possibility of any of the sewage or liquid flowing into the filtering material before passing down into the space $e$ below; but this ledge may be dispensed with, if desired, where hay, straw, or similar substance is used; but where charcoal or sand is employed it becomes necessary to use the ledge.

A single series of filtering-chambers A may be employed, or two or more series of these chambers may be arranged side by side, if desired, as shown in the drawings, so that one series may be used while the other series is being cleansed; but where the flow of the sewage is intermittent the several series may be used simultaneously, and cleansed at such times as the flow of the sewage is interrupted. The upper edges of the front walls, a, of the several filtering-chambers A may be all arranged on the same level; or they may be arranged each a little below the level of the one in front, if preferred. By thus causing the sewage or other liquid to first flow down into the bottom of each filtering-chamber, and thence upward through the filtering material and over into the next chamber, as above described, the frequent and rapid clogging of the screen and filtering material is avoided, as the tendency of the sediment or solid matter held in suspension in the sewage or liquid is to fall back or away from the filtering material and be precipitated to the bottom of the chamber, instead of rapidly accumulating within and clogging the filtering material, as is the case where it is allowed to flow over upon and pass down through it, as heretofore, and my invention is thus particularly adapted for filtering sewage on account of the rapid and economical manner in which the operation is performed, while as the greater portion of the sediment or solid matter is left at the bottoms of the filtering-chambers A unmixed with the filtering material it can be more easily removed for subsequent use as a fertilizer than is the case where the ordinary apparatus is employed. It is obvious, however, that my improved apparatus can be employed to great advantage for filtering water in large quantities for the use of cities and towns, the water being passed through the apparatus before being delivered to the aqueduct or street-mains.

What I claim as my invention, and desire to secure by Letters Patent, is—

In an apparatus for filtering and purifying sewage or other liquids, the combination, with the receiving or settling tank or basin B, of the filtering-chambers A, each provided with a screen or perforated plate, D, situated below the level of the liquid in the tank B, and having the filtering material $g$ placed thereon, said screen or plate D being raised above the bottom of its chamber to form a space, $e$, and having a space, $f$, between its front end and the front wall of the chamber, whereby the sewage or liquid is caused to pass first to the bottom of the chamber and thence flow up through the screen and filtering material to the next chamber, and an automatic gate for regulating and equalizing the flow of liquid from said tank or basin to the filtering-chambers, substantially as and for the purpose described.

Witness my hand this 1st day of September, A. D. 1882.

BENJAMIN F. WOODS.

In presence of—
P. E. TESCHEMACHER,
W. J. CAMBRIDGE.